(12) United States Patent
Maggio et al.

(10) Patent No.: US 8,842,770 B2
(45) Date of Patent: *Sep. 23, 2014

(54) METHOD OF CODING AND DECODING A PULSE SIGNAL, IN PARTICULAR AN UWB-IR SIGNAL, AND CORRESPONDING DEVICES

(71) Applicant: STMicroelectronics N.V., Amsterdam (NL)

(72) Inventors: Gian Mario Maggio, Bairo (IT); Chiara Cattaneo, Sergy (FR); Philippe Rouzet, Argonay (FR)

(73) Assignee: STMicroelectronics N.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/864,382

(22) Filed: Apr. 17, 2013

(65) Prior Publication Data

US 2013/0230076 A1 Sep. 5, 2013

Related U.S. Application Data

(62) Division of application No. 11/813,244, filed as application No. PCT/EP2005/013447 on Dec. 14, 2005, now Pat. No. 8,451,946.

(30) Foreign Application Priority Data

Jan. 3, 2005 (EP) .................................... 05290001
Jan. 4, 2005 (EP) .................................... 05290007

(51) Int. Cl.
*H04L 27/00* (2006.01)
*H04L 25/49* (2006.01)
*H04B 1/7163* (2011.01)

(52) U.S. Cl.
CPC ........ *H04B 1/71632* (2013.01); *H04L 25/4902* (2013.01); *H04B 1/71637* (2013.01)
USPC ........... 375/295; 375/298; 375/316; 375/324; 375/343; 375/347; 375/349; 375/299; 375/260; 375/142; 375/143

(58) Field of Classification Search
USPC ......... 375/295, 299, 316, 324, 142, 143, 260, 375/298, 343, 347, 349
See application file for complete search history.

(56) References Cited

U.S. PATENT DOCUMENTS

| 2,861,184 A | 11/1958 | Alexander et al. |
| 2001/0053175 A1 | 12/2001 | Hoctor et al. |
| 2003/0108133 A1 | 6/2003 | Richards |
| 2005/0179585 A1 | 8/2005 | Walker et al. |

OTHER PUBLICATIONS

Chao et al., "Novel UWB Transmitted Reference Schemes," Nov. 2004, University of Southern California, Los Angeles, California, pp. 652-656.
Rabbachin, "Synchronization Analysis for UWB Systems with a Low-Complexity Energy Collection Receiver," May 2004, University of Oulu, Oulu, Finland, pp. 288-292.

*Primary Examiner* — Kabir A Timory
(74) *Attorney, Agent, or Firm* — Allen, Dyer, Doppelt, Milbrath & Gilchrist, P.A.

(57) ABSTRACT

A method is for decoding a pulse signal modulated through a transmitted reference modulation scheme. The modulated pulse signal may include, repetitively, a reference pulse followed by an information pulse delayed with a delay. The method may include subtracting or adding from the modulated pulse signal, a version of the modulated pulse signal delayed with the delay for obtaining a processed signal, and performing a non-coherent detection on the processed signal.

17 Claims, 11 Drawing Sheets

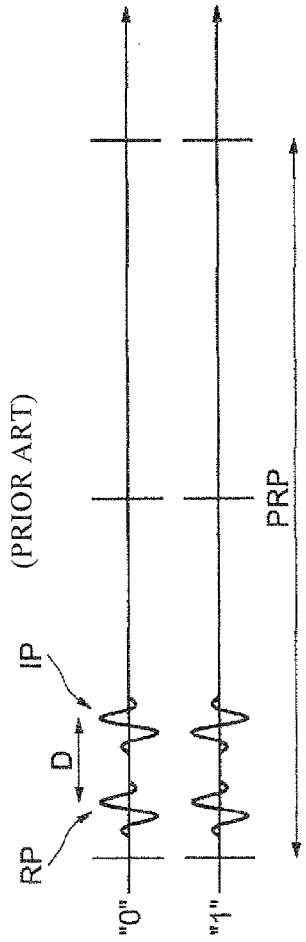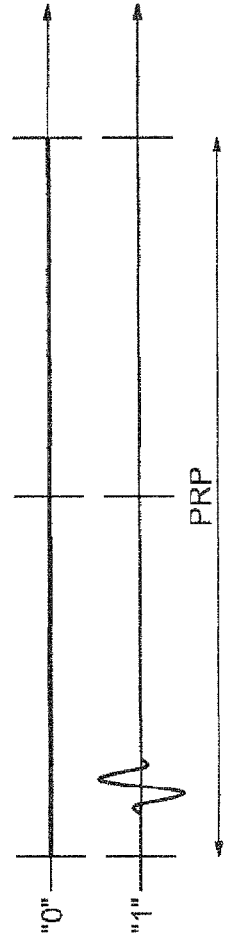

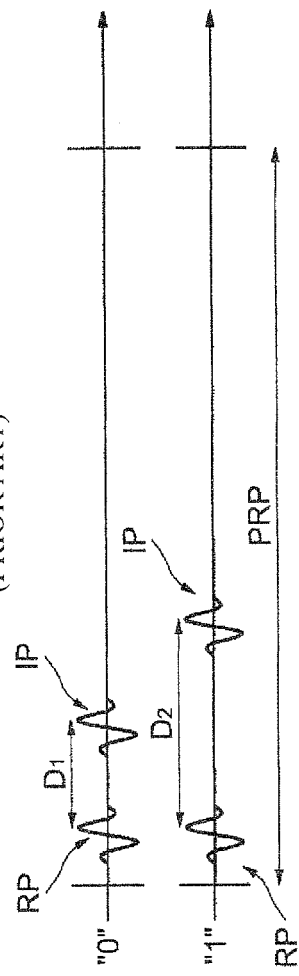

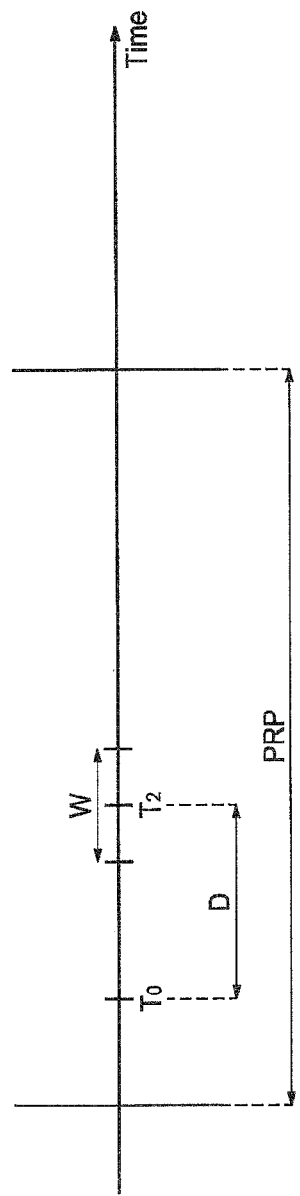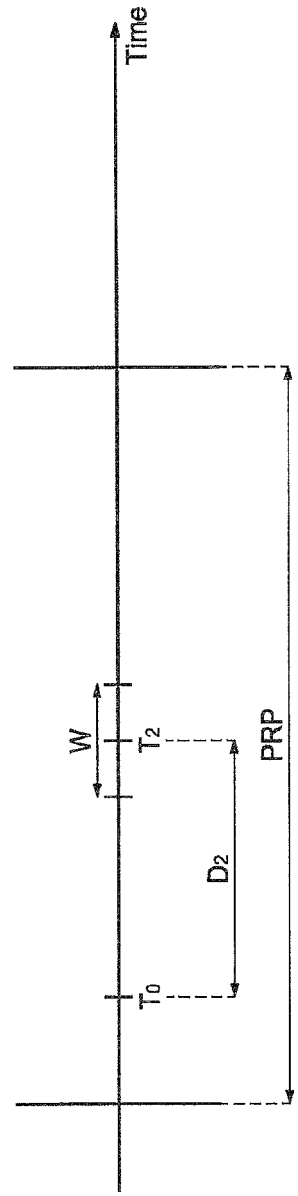

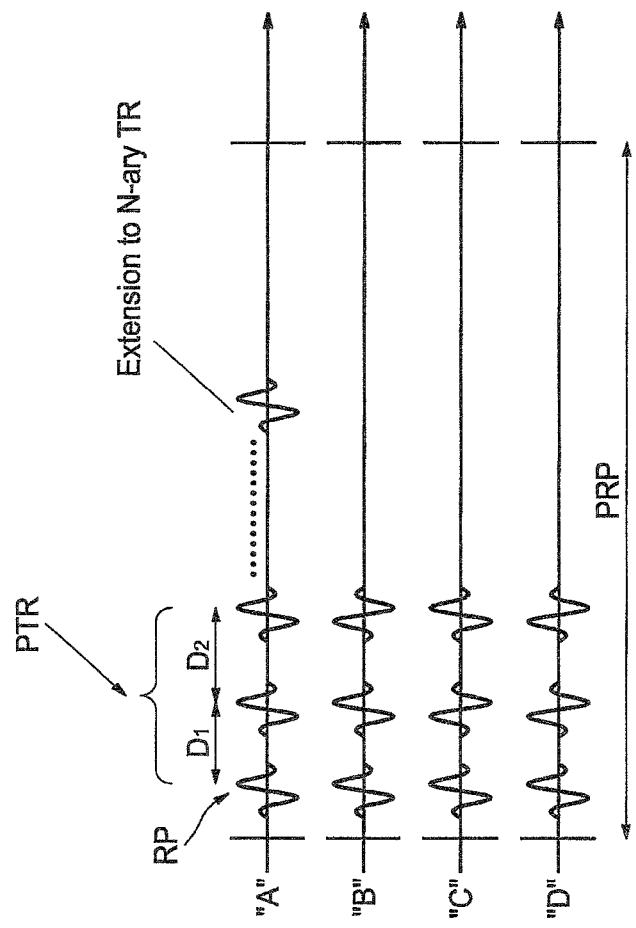

METHOD OF CODING AND DECODING A PULSE SIGNAL, IN PARTICULAR AN UWB-IR SIGNAL, AND CORRESPONDING DEVICES

FIELD OF THE INVENTION

This invention relates to a transmitted reference scheme used in the field of communications, and more specifically, in Ultra Wide Band Impulse Radio, for supporting non-coherent detection.

BACKGROUND OF THE INVENTION

Ultra Wide Band (UWB) radio may differ from conventional narrow band radio and spread-spectrum radio in that the bandwidth of the signal at −10 dB is typically greater than 20% of the center frequency, or at least 500 MHz wide. Further, in Ultra Wide Band Impulse Radio (UWB-IR), instead of transmitting a continuous carrier wave modulated with information or with the information combined with a spread code, which determines the bandwidth of the signal, a UWB radio transmits a series of very narrow impulses, typically less than ins in duration. These short time-domain impulses that are transformed into the frequency domain result in the ultra-wideband spectrum of UWB radio. Typically, the impulses are organized in time according to a certain time-hopping (TH) sequence (in general different for each user) for channelization and spectral smoothing purposes.

In the UWB-IR, the information conveyed on the signal may be coded through a transmitted reference (TR) modulation. TR modulation schemes were introduced to reduce the drawbacks of RAKE receivers, e.g. channel estimation or finding a suited template pulse waveform for correlation. In fact, for UWB-IR systems, the received signal energy is typically spread over a large number of multipaths and use a RAKE receiver with a high number of fingers, thereby becoming more complex to realize.

In TR modulation coding, two pulses are transmitted, the first pulse representing the reference pulse and the second pulse comprising the information. More precisely, DBPSK (Differential Binary Phase Shift Keying) modulation may be utilized to encode the information, meaning that, for instance, if a "0" is being transmitted, the polarity of the information pulse coincides with the polarity of the reference pulse, or vice versa if a "1" is being sent on the channel.

Transmitted reference Binary Pulse Position Modulation (TR-BPPM) coding is a specific example of a TR modulation scheme, in which two pulses are also transmitted. The first pulse represents the reference pulse, and the second pulse comprises the information. More precisely, with a BPPM (Binary Pulse Position Modulation) used to encode the information, for instance, if a "0" is being transmitted, the information pulse is delayed by a time amount $D_1$ with respect to the reference pulse or, vice versa, if a "1" is being sent on the channel, the information pulse is delayed of a time amount $D_2$ with respect to the reference pulse.

Assuming that the channel is stationary over a time frame comprising two pulses, the TR modulation scheme, and in particular, the TR-BPPM scheme, does not use explicit channel estimation since both the reference and information pulses undergo the same channel distortions. The TR modulated signal or the TR-BPPM signal then may be decoded by a differential-coherent receiver, which tends to behave as a quasi-ideal RAKE receiver, thus capturing a large portion of the energy associated with the multipath components.

One limitation of the TR modulation format is that it may not support non-coherent detection, since for the latter, the detector may not determine the polarity of the received pulses. One limitation of the TR-BPPM modulation format may be that it may not be demodulated by way of a single non-coherent detector, e.g. energy collector.

SUMMARY OF THE INVENTION

An object of the invention is to provide a method for supporting non-coherent detection of a TR modulated signal, in particular, a TR-BPPM signal, while coexisting with conventional coherent and differential-coherent receivers.

An aspect provides a method of decoding a signal, for example, an UWB-IR signal, modulated through a TR modulation scheme. The modulated signal comprises repetitively a reference pulse followed by an information pulse delayed with a delay. The method comprises subtracting or adding from the modulated signal, a version of the modulated signal delayed with the delay for obtaining a resulting signal, and performing a non-coherent detection on the resulting signal.

According to an embodiment, the modulated signal may comprise successive pulse repetition periods, each comprising the reference pulse followed by the information pulse. A central point of the reference pulse occurs at a reference time instant within the pulse repetition period, and the result of the non-coherent detection is analyzed within a time window centered on a second time instant delayed from the reference time instant with the delay. Thus, according to this embodiment, the result of the non-coherent detection may be considered as being valid within the time window. Outside this window, the resulting signal may be considered "spurious" and therefore not relevant for detection purposes.

Another aspect provides a method of decoding a pulse signal, for example, an UWB-IR signal, modulated through a transmitted reference BPPM modulation scheme. The modulated signal comprises repetitively a reference pulse followed by an information pulse delayed of a first delay or a second delay greater than the first delay depending on the value of the transmitted symbol. The method may further comprise processing the modulated signal, which may include subtracting a version of the modulated signal delayed with a delay corresponding to the difference between the second delay and the first delay, and summing a version of the modulated signal delayed with a delay corresponding to the second delay, for obtaining a processed signal. The method may further include performing a non-coherent detection on the processed signal. The result of the processing is for obtaining the processed signal and may not depend on the order of the two performed operations (subtraction and summation).

According to an embodiment, the modulated signal comprises successive pulse repetition periods, each comprising the reference pulse followed by the information pulse. A central point of the reference pulse occurs at a reference time instant within the pulse repetition period, and the result of the non-coherent detection may be analyzed within a time window centered on a second time instant delayed from the reference time instant with the second delay. Thus, according to this embodiment, the result of the non-coherent detection may again be considered as valid within the time window. Outside this window, the resulting signal may be considered "spurious", therefore not relevant for detection purposes.

According to another embodiment, performing the non-coherent detection may comprise determining the energy of the resulting signal and comparing the energy with a threshold. In the absence of noise or with low noise, and assuming for simplicity that the amplitude of each elementary pulse equals 1, such threshold could be set, for instance, to 1.5. However, in the presence of noise and interference, this value, although acceptable, may not be optimal. In such a case, the person of ordinary skill in the relevant art may be able to compute the threshold value by conventional means in a known manner as used, for example, in communication systems.

Yet another aspect provides a receiver comprising decoding means or a decoder for decoding a signal, for example, an UWB-IR signal, modulated through a TR modulation scheme. The decoding means may comprise a non-coherent architecture.

According to another embodiment, the modulated signal comprises, repetitively, a reference pulse followed by an information pulse delayed with a delay, and the decoding means comprise delay means or a buffer adapted to delay the modulated signal with the delay. The decoding means may further comprise processing means or a processor adapted to subtract from or to add to the modulated signal the delayed version of the modulated signal, and non-coherent detection means or a non-coherent detector connected to the output of the processing means. The processing means may comprise a subtractor or an adder.

According to an additional embodiment, the modulated signal comprises successive pulse repetition periods, each comprising the reference pulse followed by the information pulse. A central point of the reference pulse occurs at a reference time instant within the pulse repetition period, and the decoding means or a decoder may further comprise analyzing means or an analyzer adapted to analyze the result of the non-coherent detection within a time window centered on a second time instant delayed from the reference time instant with the delay. The TR modulation scheme may be a TR-BPPM modulation scheme.

In such a case and according to an embodiment, the modulated signal comprises, repetitively, a reference pulse followed by an information pulse delayed of a first delay or a second delay greater than the first delay depending on the value of the transmitted symbol. The decoding means may comprise first delay means or a first buffer adapted to delay the modulated signal with a delay equal to the difference between the second delay and the first delay, second delay means or a second buffer adapted to delay the modulated signal with a delay equal to the second delay, processing means or a processor including a input adapted to receive the modulated signal, subtracting means or a subtractor coupled to the input of the processor and to the output of the first delay means, and adding means or an adder coupled to the input of the processor and to the output of the second delay means, non-coherent detection means or a non-coherent detector connected to the output of the processing means.

For example, the subtracting means and the adding means of the processing means may be realized with an analog adder circuit having at least three inputs and at least one output. A first input of the adder is, for example, connected to the input of the processor for receiving the modulated signal. A second input of the adder is inverted and connected to the output of the first delay means, and the third input of the adder is connected to the output of the second delay means.

According to an embodiment, the modulated signal comprises successive pulse repetition periods, each comprising the reference pulse followed by the information pulse. A central point of the reference pulse occurs at a reference time instant within the pulse repetition period, and the decoding means further comprise analyzing means or an analyzer adapted to analyze the result of the non-coherent detection within a time window centered on a second time instant delayed from the reference time instant with the second delay.

According to another embodiment, the non-coherent detection means comprises an energy detector and comparison means or a comparer adapted to compare the energy value delivered by the energy detector with a threshold. The receiver may be an element of a wireless communication system using an UWB technology, such as, a laptop.

In other words, an aspect comprises an UWB-IR communication scheme utilizing the TR or TR-BPPM modulation format and comprising a non-coherent version of the receiver, such that, each information pulse waveform is added or subtracted in phase with the reference pulse waveform, thus resulting in a OOK (On-Off Keying)-like modulation which can be detected through a non-coherent demodulator (e.g. energy detector). Non-coherent detection may coexist with the differential-coherent one, while decoding the same transmitted signal.

The choice of the receiver architecture may depend, in general, upon the trade-off between performance and complexity. One advantage, with respect to pure OOK modulation, is that when a symbol is being transmitted, there may always be energy present on the channel (in contrast, for example, to the case where a long sequence of "0"'s is being transmitted on the channel by pure OOK). This can be useful for synchronization/tracking purposes since the reference pulse is always available on the channel, typically associated with a given time hopping (TH) sequence. In addition, the reference pulse may be used to estimate the detection threshold, a possible practical limitation of OOK.

However, regardless of the method of decoding used, the conventional basic TR modulation scheme may not be energy efficient since the reference pulse does not carry any information. In other words, since two pulses are mapped to one bit of information, the data rate of the TR modulation scheme is halved with respect to a coherent scheme. In terms of bit-error-rate (BER) performance, this reflects in an asymptotic loss of 3 dB in comparison to the coherent receiver case.

Another object is to provide an approach to this problem. Another object is to provide an energy efficient method of transmitting information through a generalized transmitter reference (GTR) scheme. Another object is to provide a general method for supporting non-coherent detection of a GTR signal while coexisting with conventional coherent and differential-coherent receivers.

According to another embodiment, an UWB-IR communication scheme comprises a generalized TR modulation where, for each reference pulse, two or more information pulses are transmitted. This may reduce the transmitted energy/bit, since the energy associated with the reference pulse is "shared" among the information pulses. Accordingly, the system data-rate may be increased, because on average, more bits are being transmitted per unit pulse. The improved performance, though, translates into an increased receiver complexity. Namely, in the case of differential-coherent receiver, one correlation operation is used for each information pulse.

In the non-coherent version of the receiver, each information pulse waveform may be added or subtracted in phase with the reference pulse waveform, thus resulting in an On-Off Keying (OOK) like modulation which can be detected through a non-coherent demodulator (e.g. energy detector). The coherent, differential-coherent, and non-coherent versions of the receiver may coexist, while decoding the same transmitted signal. The choice of the receiver architecture may depend, in general, upon the trade-off between performance and complexity. One advantage, with respect to pure OOK modulation, is that when a symbol is being transmitted, there may be always energy present on the channel (in contrast, for example, to the case where a long sequence of "0"'s is being transmitted on the channel by pure OOK). This can be useful for synchronization/tracking purposes since the reference pulse is always available on the channel, typically associated with a given TH sequence. In addition, the reference pulse may be exploited to estimate the detection threshold, a possible practical limitation of OOK.

Thus, according to another aspect, it is provided a method of coding information to be conveyed by a pulse signal, for example, an UWB-IR signal, comprising sending, repetitively, a reference pulse followed by a pulse train including at least a first information pulse delayed with respect to the reference pulse and a second information pulse delayed with respect to the first information pulse. In other words, within each Pulse Repetition Period (PRP), a reference pulse is transmitted followed by a pulse train including at least two delayed information pulses. The inter-pulse intervals may be characterized by a sequence of at least two relative delays. The first relative delay of the sequence may be the inter-pulse interval between the first information pulse and the reference pulse, and the second relative delay may be the inter-pulse interval between the two information pulses. Thus a multi-level modulation is realized.

According to an embodiment, the pulse train may comprise N delayed information pulses. The first information pulse of the pulse train may be delayed with respect to the reference pulse, and each other information pulse of the pulse train may be delayed with respect to the preceding information pulse in the pulse train. Each information pulse may have a polarity equal or opposite to the polarity of the reference pulse, thereby defining $2^N$ possible values for the information.

According to another aspect, it is also provided a method of decoding a pulse signal, for example, an UWB-IR signal, modulated through a transmitted reference modulation scheme including, repetitively, a reference pulse followed by a pulse train including at least a first information pulse delayed with respect to the reference pulse and a second information pulse delayed with respect to the first information pulse. The method comprises performing the decoding within either a coherent receiving architecture, a differential-coherent receiving architecture, or a non-coherent receiving architecture. When using a coherent receiving architecture, each pulse may be advantageously detected separately. When using a differential-coherent architecture, the decoding may advantageously comprise a correlation of the signal with multiple delayed versions of the signal itself.

According to another embodiment, performing the decoding may comprise delaying the modulated signal with respective delays corresponding to those used in the transmitted reference modulation scheme, for obtaining respective versions of the signal respectively delayed with respect to the modulated signal. The performing may further comprise, respectively, subtracting from or adding to the modulated signal the delayed versions of the modulated signal. This is for obtaining respective processed signals, and respectively performing a non-coherent detection on the processed signals.

Advantageously, the modulated signal comprises successive pulse repetition periods, each comprising the reference pulse followed by the information pulse. A central point of the reference pulse may occur at a reference time instant within the pulse repetition period. The result of each non-coherent detection is analyzed within a time window centered on a second time instant delayed from the reference time instant with a delay matching the delay of the corresponding delayed version of the modulated signal.

According to another aspect, it is also provided a transmission apparatus, comprising transmission means or a transmitter for sending a pulse signal, for example, an UWB-IR signal, and coding means or a coder for coding information to be conveyed by the pulse signal. The coding means are adapted to repetitively insert a reference pulse followed by a pulse train including at least a first information pulse delayed with respect to the reference pulse and a second information pulse delayed with respect to the first information pulse.

According to another embodiment, the pulse train may comprise N delayed information pulses, the first information pulse of the pulse train being delayed with respect to the reference pulse. Each other information pulse of the pulse train is delayed with respect to the preceding information pulse in the pulse train. Each information pulse has a polarity equal or opposite to the polarity of the reference pulse, thereby defining $2^N$ possible values for the information.

According to another aspect, it is also provided a receiver comprising decoding means or a decoder for decoding a pulse signal modulated through a transmitted reference modulation scheme including, repetitively, a reference pulse followed by a pulses train including at least a first information pulse delayed with respect to the reference pulse and a second information pulse delayed with respect to the first information pulse. The decoding means are arranged in either a coherent architecture, a differential-coherent architecture, or a non-coherent architecture.

When the decoding means are arranged in a coherent architecture, they may comprise detection means or a detector adapted to detect each pulse separately. When the decoding means are arranged in a differential-coherent architecture, they may comprise correlation means or a correlation processor adapted to perform a correlation of the signal with multiple delayed versions of the signal itself.

According to an embodiment, the decoding means comprises delay means for delaying the modulated signal with respective delays corresponding to those used in the transmitted reference modulation scheme. This is for obtaining respective versions of the modulated signal respectively delayed with respect to the modulated signal. Processing means are adapted to respectively subtract from or add to the modulated signal the delayed versions of the modulated signal, for obtaining respective processed signals, and non-coherent detection means connected to the outputs of the processing means and adapted to respectively perform non-coherent detections on the processed signals.

According to another embodiment directed to non-coherent detection, the modulated signal may comprise successive pulse repetition periods, each comprising the reference pulse followed by the information pulse. A central point of the reference pulse may occur at a reference time instant within the pulse repetition period, and the decoding means may further comprise analyzing means adapted to respectively analyze the results of the non-coherent detections within respective time windows centered on respective second time instants respectively delayed from the reference time instant with delays matching the delays of the corresponding delayed version of the modulated signal. The non-coherent detection means may comprise energy detectors and comparison means adapted to compare the energy values respectively delivered by the energy detectors with a threshold. The receiver can be an element of a wireless communication system or a Wireless Sensor Network, using an UWB technology.

BRIEF DESCRIPTION OF THE DRAWINGS

Other advantages and features of the invention may appear upon examining the detailed description of embodiments, these being in no way limiting, and of the appended drawings in which:

FIGS. 1a and 1b respectively represent TR and OOK modulation formats, according to the prior art;

FIG. 1c represents a TR-BPPM modulation format, according to the prior art;

FIG. 5 illustrates a time window used for analyzing a non-coherent detection, according to an embodiment of the present invention;

FIG. 8 illustrates a time window used for performing a non-coherent detection of a TR-BPPM signal, according to an embodiment of the present invention;

FIG. 9 illustrates a Generalized Transmitter Reference (GTR) modulation format, according to an embodiment of the present invention;

DETAILED DESCRIPTION OF THE PREFERRED EMBODIMENTS

Some basics about the conventional TR (Transmitted Reference) and OOK (On-Off Keying) modulation schemes, in the context of UWB-IR, are now detailed. The TR and OOK modulation formats are illustrated in FIGS. 1a and 1b, respectively. In the figures, PRP denotes the Pulse Repetition Period having for example a value equal to 100 ns. Referring to FIG. 1a, we assume that the pulse waveforms are identical, except for the polarity "flipping" due to the DBPSK (Differential Binary Phase Shift Keying) modulation. In the example shown, a reference pulse RP is transmitted, followed by the information pulse IP delayed by a time amount equal to D. The duration of each pulse is equal for example to 1 ns.

If a "0" is being transmitted, the polarity of the information pulse coincides with the polarity of the reference pulse, or vice versa, it is inverted in polarity if a "1" is being transmitted. On the other hand, referring to FIG. 1b, the illustration of OOK is self-explanatory: No signal on the channel corresponds to a "0", while a transmitted pulse corresponds to a "1". This TR scheme may be decoded, for example, either according to a coherent architecture, a differential-coherent receiver architecture, or by way of a non-coherent receiver architecture.

Figure 2:
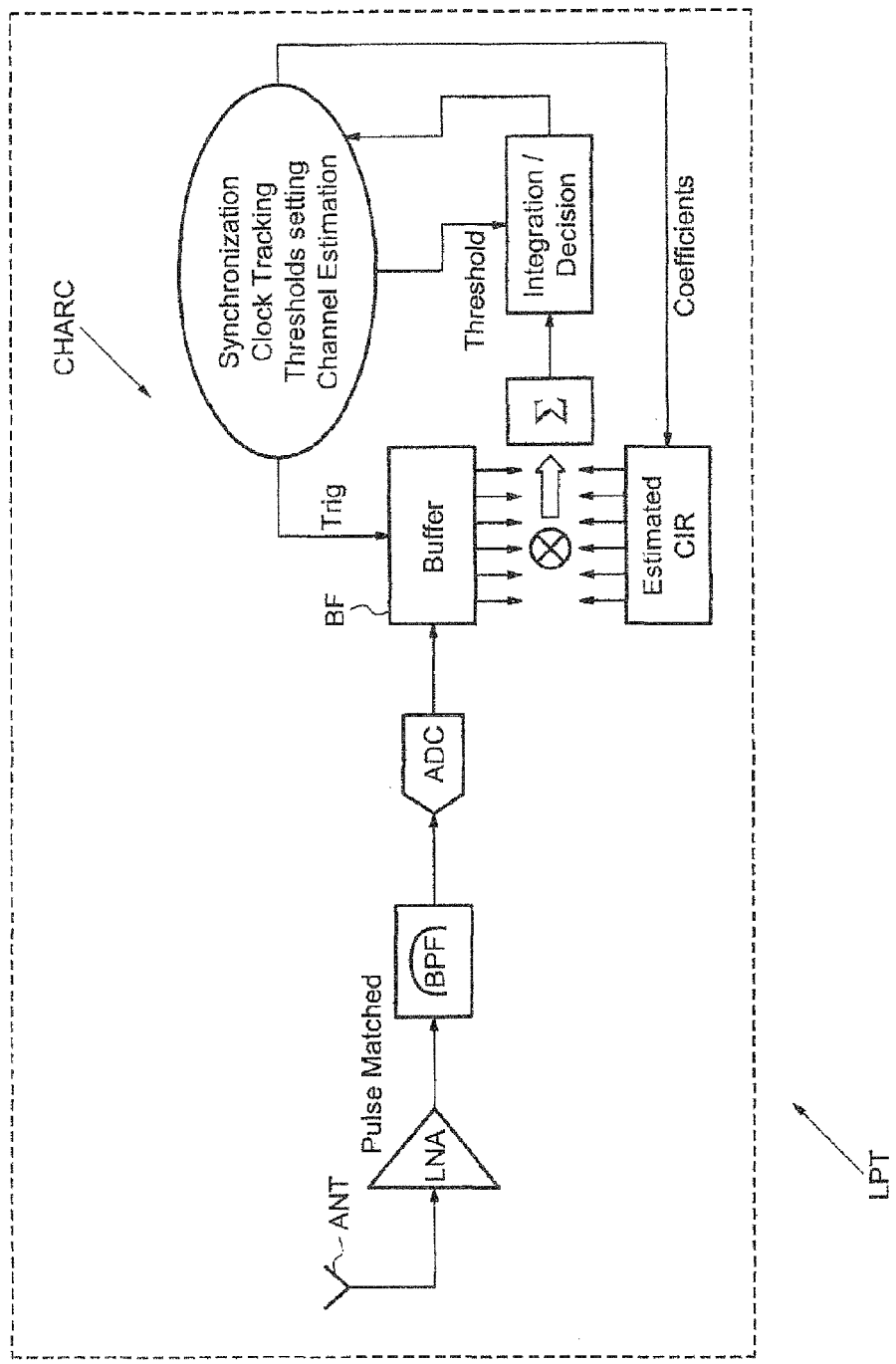
FIG. 2 shows diagrammatically a coherent receiver architecture, according to the prior art.

A conventional coherent TR receiver architecture CHARC is illustrated in FIG. 2. Such an architecture may be incorporated in a laptop LPT, for example. The incident signal from the antenna ANT of the laptop is first amplified by an LNA (low-noise amplifier), then band-pass filtered (BPF), correspondingly to the pulse bandwidth. The resulting signal is then converted onto digital form by an ADC (Analog to Digital Converter) and the corresponding digital samples are stored in a buffer BF. The latter are then correlated with the estimated Channel Impulse Response (CIR), thus realizing a RAKE receiver which allows to capture a large portion of the received signal energy.

The result is integrated over the symbol period and then a decision about the symbol received is taken, according to a decision threshold. Of course, to work properly, such scheme uses a prior synchronization phase for code acquisition and clock tracking. This can be achieved, for example, by transmitting a (known) synchronization preamble. More precisely the synchronization function mentioned in the FIG. 2 refers to the task, taking place prior to encoding/decoding, of establishing a common time reference between transmitter and receiver. In the context of spread-spectrum systems, like for UWB, it permits the acquisition of pseudo-noise (PN) code, prior to demodulation.

These synchronization functions are known in communication systems and are performed by conventional means. The person of ordinary skill in the relevant art may refer, for example, to R. R. Rick and L. B. Milstein "Optimal decision strategies for acquisition of spread-spectrum signals in frequency-selective fading channels", IEEE Trans. Commun., vol. 46, no. 5, pp. 686-694, May 1998.

Figure 3:
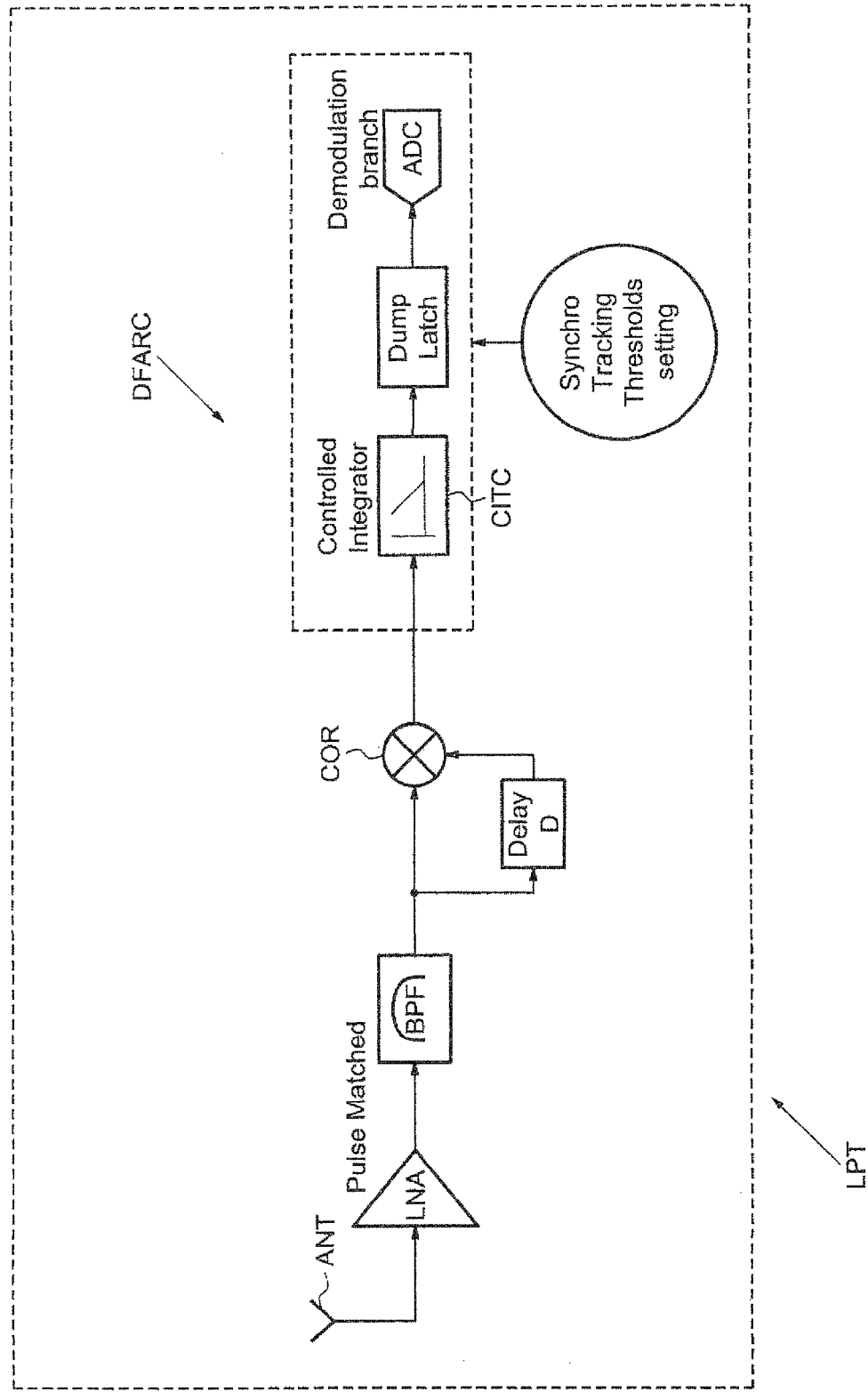
FIG. 3 shows diagrammatically a differential-coherent receiver architecture, according to the prior art.

The same principle can be applied for channel estimation purposes to estimate the channel coefficients to be fed to the RAKE receiver. A conventional differential-coherent TR receiver architecture DFARC is illustrated in FIG. 3 and may be also incorporated, for example, in a laptop LPT. The incident signal from the antenna ANT is first amplified by an LNA (low-noise amplifier), then band-pass filtered (BPF), correspondingly to the pulse bandwidth.

The received signal is then correlated in correlation means COR (Multiplier) with a delayed version of the signal itself, according to a delay matching the delay D used for the TR modulation (FIG. 1a). This greatly simplifies the channel estimation phase, still enabling to capture most of the received signal energy. The underlying assumption for the scheme to work effectively is that the channel is stationary over the symbol period. The correlation result is then fed to a controlled integrator circuit CITC which is periodically dumped, according to the symbol duration. Then, the signal is converted onto digital form by an ADC and ready for demodulation. Synchronization is achieved prior to communication, and clock drift is tracked accurately for the scheme to work properly.

Figure 4:
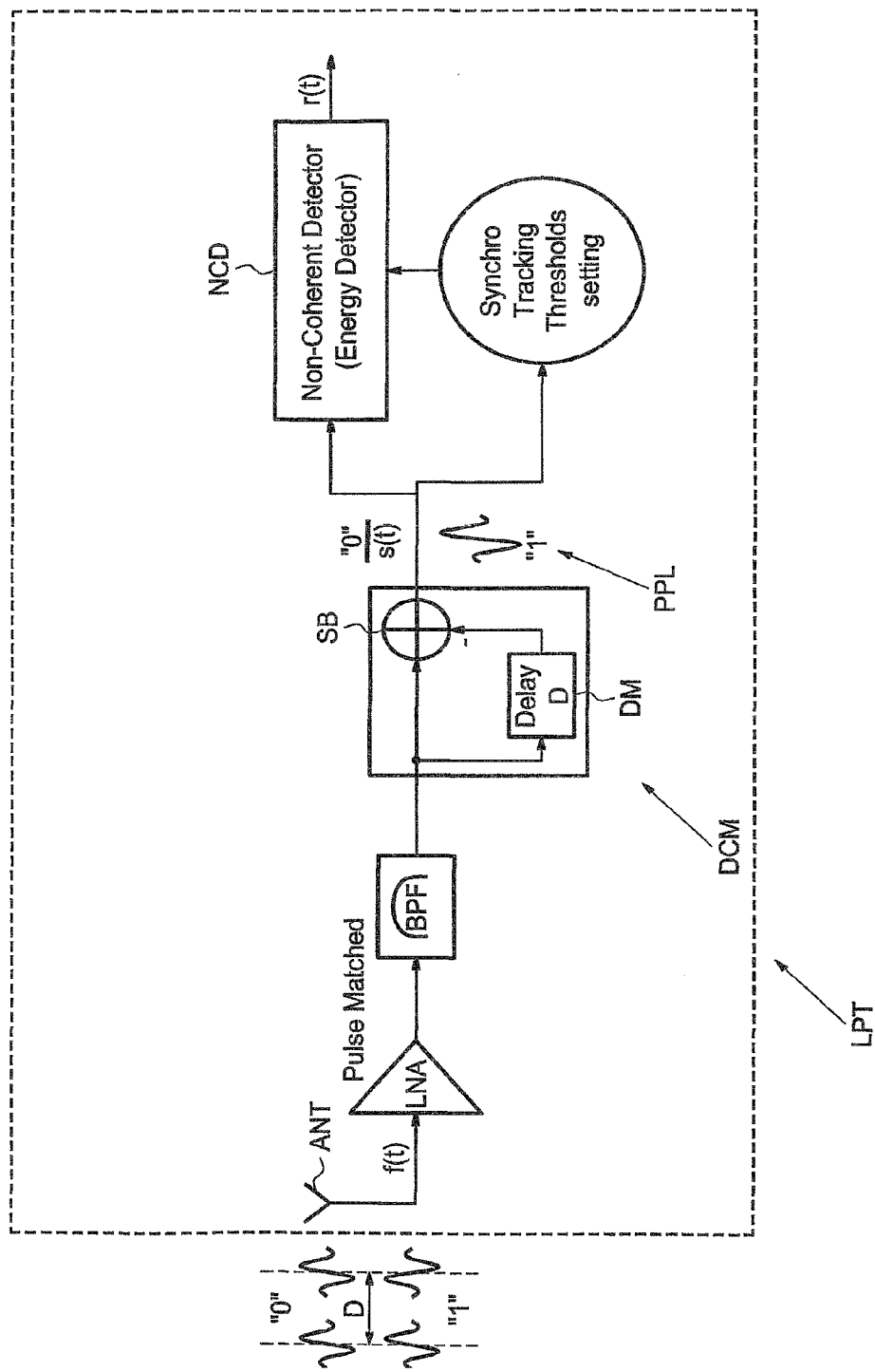
FIG. 4 shows diagrammatically a non-coherent receiver architecture for detecting the TR signal, according to an embodiment of the present invention.

A non-coherent TR receiver architecture, according to an embodiment, is illustrated in FIG. 4 and is, for example, incorporated in a laptop LPT. The method to demodulate a TR signal by using a non-coherent receiver is also a contribution of the present embodiments. The incident signal f(t) from the antenna is first amplified by an LNA (low-noise amplifier) of the laptop, then band-pass filtered (BPF), correspondingly to the pulse bandwidth.

The receiver LPT further comprises decoding means DCM coupled to the output of the band-pass filter BPF. The decoding means comprises here a subtractor SB or possibly an adder, as well as delay means DM and a non-coherent detector NCD. As a matter of fact, a feature of this embodiment comprises subtracting (or adding) in phase within a subtractor SB (or an adder), a delayed version of the received signal, according to the same delay D employed by the TR scheme, with the signal itself. The signal is delayed in the conventional delay means DM. Correspondingly, the resulting processed signal, s(t), may be decoded by using the non-coherent detector NCD, such as, an energy detector, similar to OOK modulation (FIG. 1b).

More precisely, as illustrated in particular in FIG. 5, the central point of the reference pulse occurs at a reference time instant T0 within each pulse repetition period. However, this reference pulse is delayed with the delay D, and the output of the delay means DM may occur at a second time instant T2 delayed from T0 with the delay D. Further at this time instant, the subtractor SB may receive simultaneously the delayed reference pulse and the information pulse. Thus, if a "0" has been transmitted, the resulting processed signal s(t) may be null within a window W centered on the time instant T2, whereas it may comprise a processed pulse PPL having substantially the same shape as that of the reference pulse but with a doubled amplitude, if a "1" has been transmitted.

If an adder is used instead of a subtractor, the resulting processed signal may be null within the window W if a "1" has been transmitted, whereas it may comprise the processed pulse PPL having substantially the same shape as that of the reference pulse but with a doubled amplitude, if a "0" has been transmitted. The processed signal s(t) is then decoded by non-coherent detection means NCD, the result of the non-coherent detection is preferably analyzed within the time window W. Outside this window W, the response should be considered as "spurious". For example, the width of the window W may be equal the duration of a pulse, for example, 1 ns.

Figure 6:
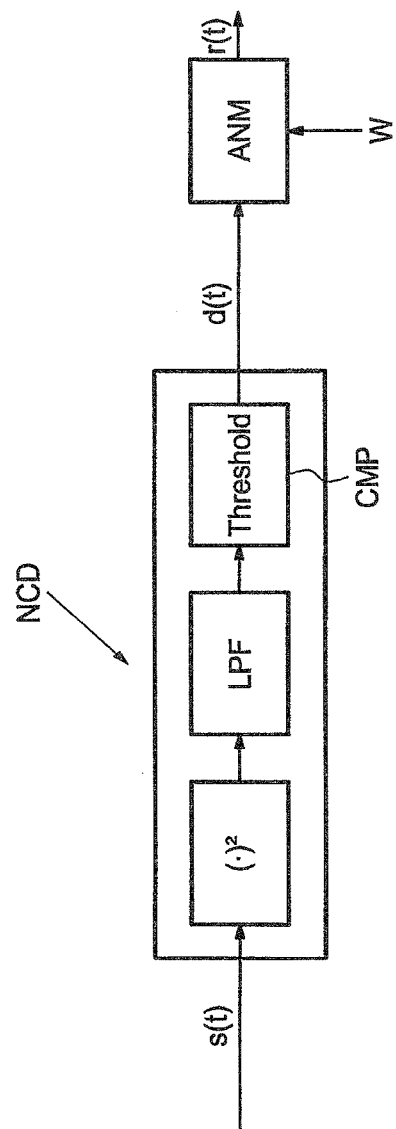
FIG. 6 shows diagrammatically more in details a possible embodiment of Non-Coherent Detector, according to the present invention.

A possible embodiment of a non-coherent detector is illustrated diagrammatically in FIG. 6. Namely, in this example, the processed signal s(t) is first squared, then low-pass filtered (LPF), and finally a decision threshold is applied for decoding the received signal. More precisely, the output of the low-pass filter LPF is compared in the comparison means CMP with a threshold. With the assumption illustrated in FIG. 4, if the result d(t) of the comparison exceeds the threshold, a "1" is decoded whereas a "0" is decoded if the result of the comparison is smaller than the threshold.

In the absence of noise or with low noise, and assuming for simplicity that the amplitude of each elementary pulse equals to 1, such threshold could be set, for instance, to 1,5. However, in presence of noise and interference this value although acceptable, may not be optimal. In such a case the person of ordinary skill in the relevant art may be able to compute the threshold value by conventional means in a known manner as used, for example, in communication systems.

Of course as explained above, the decoding means preferably further comprise analyzing means for analyzing the result of the comparison within the window W. Practically, for example, the output of the comparator CMP may be declared valid within the window W and not valid outside of the window. Some basics about the TR-BPPM modulation scheme, in the context of UWB-IR are now detailed. The modulation format is illustrated in FIG. 1c. PRP denotes the Pulse Repetition Period. Referring to FIG. 1c, it is assumed that the pulse waveforms are identical, and that they are shifted in time with respect to each other according to the BPPM (Binary Pulse Position Modulation). In the example shown, a reference pulse RP is transmitted, followed by the information pulse IP delayed of a time amount equal to a first delay $D_1$ (for example 10 ns) or a second delay $D_2$ (for example 15 ns), depending on whether the symbol "0" or "1" is being transmitted.

This TR-BPPM scheme may be also decoded, for example, either according to a coherent architecture, a differential-coherent receiver architecture, or according to an embodiment by way of a non-coherent receiver architecture. A non-coherent TR receiver architecture, according to a possible embodiment, is illustrated in FIG. 7 and is, for example, incorporated in a laptop LPT.

Figure 7:
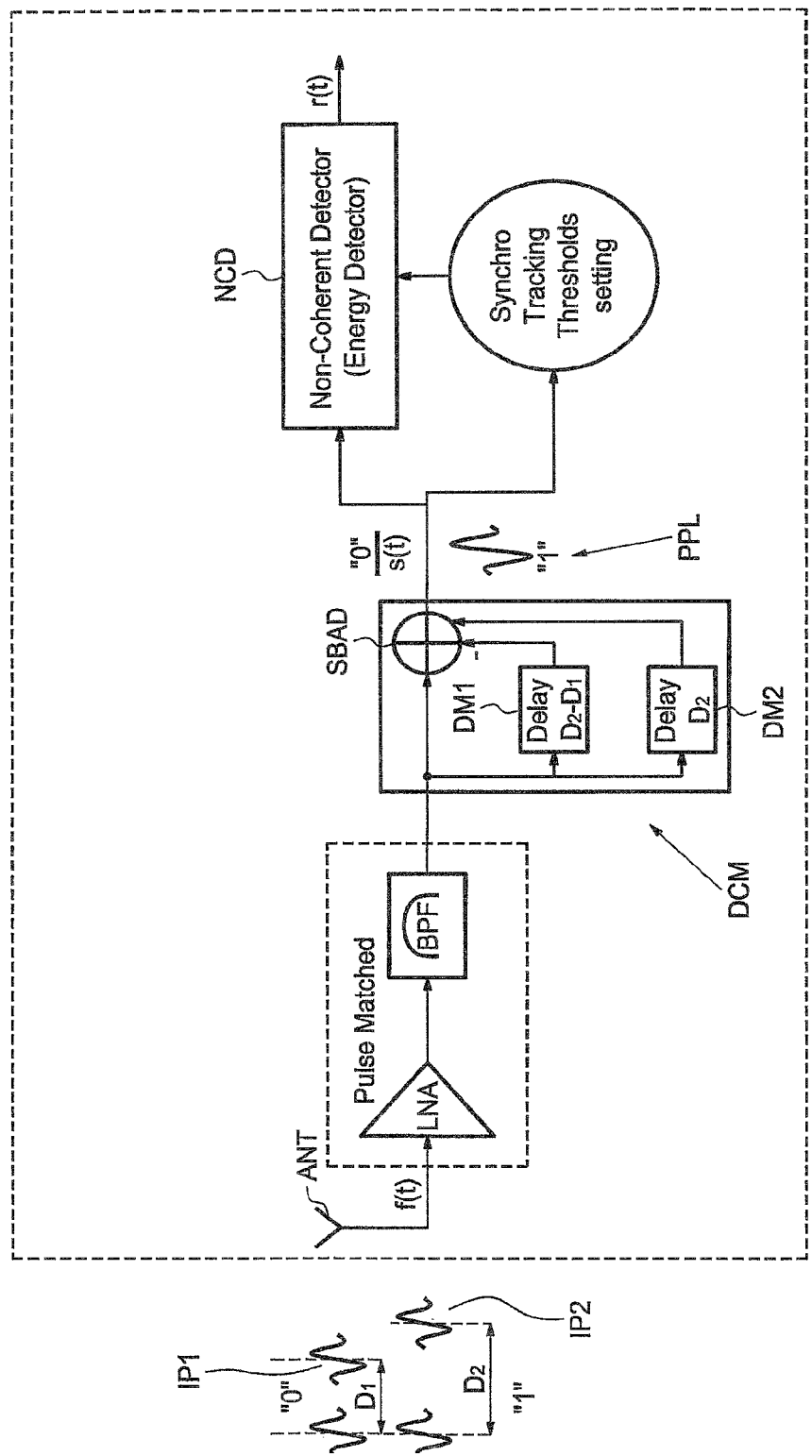
FIG. 7 shows diagrammatically a non-coherent receiver architecture for detecting the TR-BPPM signal, according to an embodiment of the present invention.

For simplification reasons, only the differences between FIGS. 4 and 7 may be now described. The receiver LPT comprises decoding means DCM coupled to the output of the band-pass filter BPF. The decoding means comprises processing means SBAD including a subtractor and an adder, as well as first delay means DM1 and second delay means DM2 and a non-coherent detector NCD. A feature of this embodiment comprises processing the modulated signal outputted by the filter BPF, the processing including subtracting a version of the modulated signal delayed by the first delay means DM1 with a delay corresponding to $D_2-D_1$ and summing a version of the modulated signal delayed by the second delay means DM2 with a delay corresponding to $D_2$, for obtaining a processed signal s(t), and performing a non-coherent detection on the processed signal.

The result of the processing for obtaining the processed signal does not depend on the order of the two performed operations (subtraction and summation). For example, the subtracting means and the adding means of the processing means may be realized with an analog adder circuit having three inputs and one output. A first input of the adder is, for example, connected to the main input for receiving the modulated signal, a second input of the adder is inverted and connected to the output of the first delay means DM1, and the third input of the adder is connected to the output of the second delay means DM2.

As illustrated in particular on FIG. 8, the central point of the reference pulse occurs at a reference time instant T0 within each pulse repetition period. However, this reference pulse is on one hand delayed with the delay $D_2-D_1$ and on the other hand delayed with the delay $D_2$. At a second time instant T2 delayed from T0 with the delay $D_2$, and if a "1" has been received, the adder of the processing means simultaneously receives from the second delay means DM2 the reference pulse delayed with delay $D_2$ and the information pulse IP2 (FIG. 7). Thus the adder, and consequently the processing means, delivers within the window W centered around T2 the processed signal s(t) including the pulse PPL having a doubled amplitude with respect to the reference pulse.

At the second time instant T2 delayed from T0 with the delay $D_2$, and if a "0" has been received, the subtractor of the processing means simultaneously receives from the second delay means DM2 the reference pulse delayed with delay $D_2$ and from the first delay means DM1 the information pulse IP1 (FIG. 7) further delayed with the delay $D_2-D_1$. Thus the subtractor, and consequently the processing means, delivers within the window W centered around T2 the processed signal s(t) having a null level.

Outside of the window W, the value of the processed signal s(t) is considered spurious and irrelevant for the non-coherent detection. The processed signal s(t) is then decoded by non-coherent detection means NCD, the result of the non-coherent detection being analyzed within the time window W, for example, in a manner analogous to that described with reference to FIGS. 4 and 6.

In the case of TR-BPPM modulation also, the threshold estimation, as well as the synchronization/tracking operations are made more effective by the presence of a signal on the channel (during communication), with respect to pure OOK modulation. Whatever the method of decoding used, the conventional basic TR schemes may be considered in some applications as being inefficient with energy since the reference pulse does not carry any information. In other words, since two pulses are mapped to one bit of information, the data rate of the TR schemes is halved with respect to a coherent scheme. In terms of BER (bit-error-rate) performance, this reflects into an asymptotic loss of 3 dB in comparison to the coherent receiver case.

Thus according to one embodiment, an efficient scheme, called Generalized Transmitted Reference (GRT) modulation scheme, is represented pictorially in FIG. 9. Basically, for each PRP time period, a reference pulse RP is transmitted, followed by a pulse train PTR, comprising N pulses, and realizing a multi-level modulation. The inter-pulse intervals may be characterized by a sequence of length N: $\{D_1, D_2, \ldots, D_N\}$ representing the relative delays. The delay $D_1$ represents the relative delay between the first information pulse and the reference pulse whereas the delay $D_i$, with i greater than 1 is the relative delay between the current information pulse and the preceding information pulse. Such delays may be commensurate with the data-rate use and with the channel delay spread to prevent inter-pulse interference (IPI).

In the example shown, 2-TR is considered, that is for each reference pulse, two information pulses are transmitted, each carrying one bit of information according to the DBPSK modulation, with respect to the reference pulse. Therefore, an alphabet of four symbols ("A", "B", "C", "D") may be defined and associated with the 2-TR signal constellation.

In general, for N-ary TR, the cardinality of the alphabet is given by $2^N$. This scheme is different from the basic Transmitted Reference (TR) modulation format, shown in FIG. 1a. The energy associated with the reference pulse is "shared" among two or more information pulses, resulting in a more energy-efficient communication scheme. The efficiency of N-ary TR turns out to be proportional to $(N-1)/N$.

The GTR modulation format, according to an embodiment, may be decoded by way of a coherent, differential-coherent and non-coherent receiver architecture. A possible embodiment, for LDR (low data rate) applications, follows the principle of transmitting bursts of information relatively concentrated in time to enable the receiver to remain in "sleep" mode most of the time. This aspect may be important for minimizing power consumption, for instance, in wireless sensor network (WSN) applications.

Figure 10:
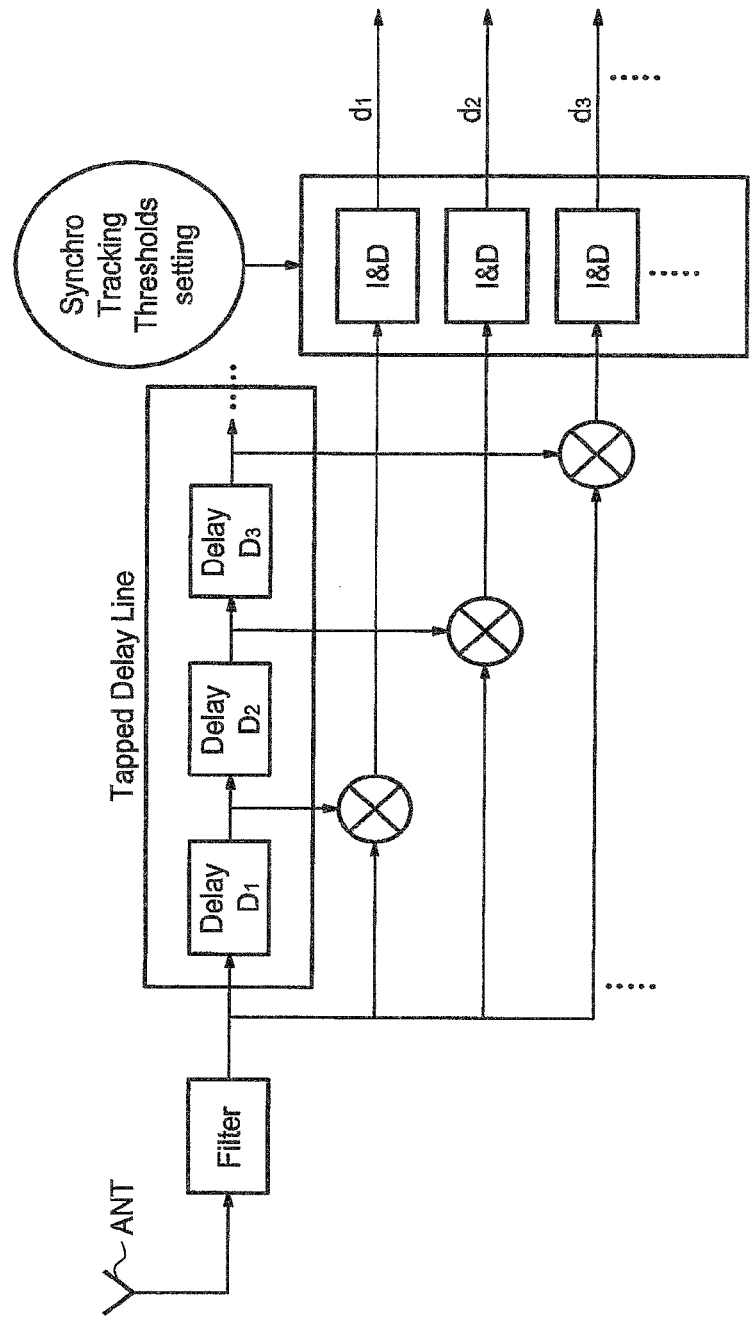
FIG. 10 shows diagrammatically a differential-coherent receiver architecture for the GTR modulation format, according to an embodiment of the present invention.

For GTR modulation, the coherent receiver architecture according to an embodiment basically coincides with the one shown in FIG. 2, where each pulse waveform is detected separately, therefore preserving the polarity information. On the other hand, a possible embodiment of a differential-coherent receiver, like a laptop, is represented diagrammatically in FIG. 10. Namely, after the received signal is filtered and conditioned, it is fed through a tapped delay line whose delay values $(D_1, D_2, D_3, \ldots)$ match those used by the GTR modulation at the transmitter side.

Consequently, the received signal is correlated with multiple delayed version of the signal itself, and the correlation results are subject to a controlled Integrate & Dump (I&D) operation, from which the decision variables $d_1, d_2, d_3, \ldots$ are extracted. As usual, the communication overhead comprises synchronization/tracking and threshold settings, while the channel estimation phase is spared, due to the differential-coherent nature of the receiver. It should be noted that in this case, the channel is preferably kept stationary over the multiple symbol duration.

Figure 11:
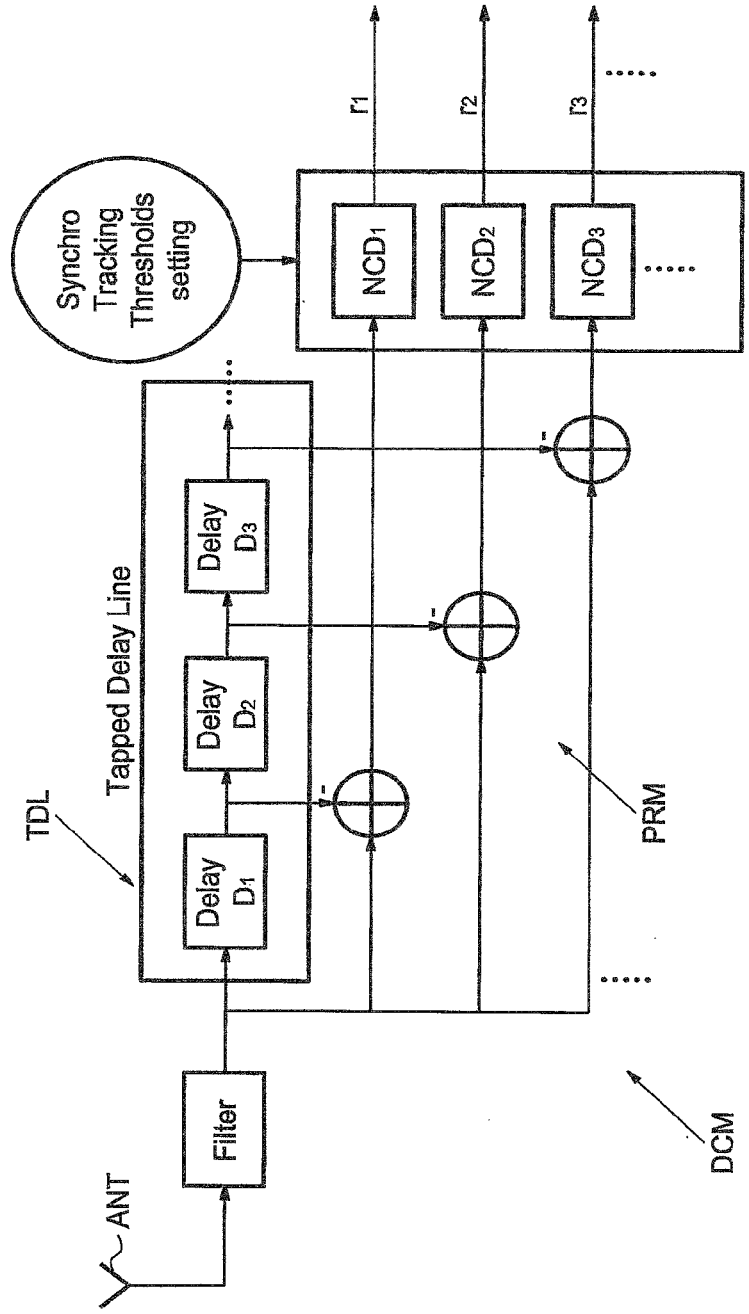
FIG. 11 shows diagrammatically a possible embodiment of non-coherent receiver architecture for the GTR modulation format, according to the present invention.

Finally, according to another embodiment, a non-coherent receiver architecture for the GTR modulation scheme is shown diagrammatically in FIG. 11. This can be considered as an extension of the basic TR non-coherent receiver structure, reported in FIG. 4, with a possible embodiment of non-coherent detector (NCD) shown in FIG. 6. Referring to FIG. 11, after the received signal is conditioned, it is fed through a tapped delay line TDL, with delays matching the GTR modulation format, and added (or subtracted) in phase with the signal itself, in order to convert the modulation format to OOK. Then, standard non-coherent detection is applied to each branch, resulting in the outputs $r_1, r_2, r_3 \ldots$.

More precisely, the decoding means comprises delay means TDL for delaying the modulated signal with respective delays $D_1, D_2, D_3, \ldots$ corresponding to those used in the transmitted reference modulation scheme, for obtaining respective versions of the modulated signal respectively delayed with respect to the modulated signal, processing means PRM adapted to respectively subtract from or add to the modulated signal the delayed versions of the modulated signal, for obtaining respective processed signals, and non-coherent detection means $NCD_1, NCD_2, NCD_3$, connected to the outputs of the processing means and adapted to respectively perform non coherent detections on the processed signals.

As for FIG. 4, the central point of the reference pulse occurs at a reference time instant within the pulse repetition period, and the decoding means further comprise analyzing means adapted to respectively analyze the results of the non-coherent detections within respective time windows $W_1, W_2, W_3 \ldots$ centered on respective second time instants respectively delayed from the reference time instant with delays $D_1, D_2, D_3, \ldots$ matching the delays $D_1, D_2, D_3, \ldots$ of the corresponding delayed versions of the modulated signal. The non-coherent detection means may comprise energy detectors and comparison means adapted to compare the energy values respectively delivered by the energy detectors with a threshold.

That which is claimed is:

1. A method of coding and decoding information conveyed by a pulse signal by a transceiver device, the method comprising:
   sending repetitively, from the transceiver, a reference pulse followed by a pulse train, the pulse train including at least a first information pulse delayed with respect to the reference pulse by a first delay and a second information pulse delayed with respect to the first information pulse by a second delay different from the first delay; and
   decoding a received pulse signal, at the transceiver device, by at least
   adding to the pulse signal, a first version of the modulated pulse signal respectively delayed with the second delay, and subtracting from the modulated pulse signal, a second version of the modulated pulse signal respectively delayed with a third delay equal to the second delay minus the first delay for obtaining a processed signal based upon the transmitted reference modulation scheme, and
   performing a non-coherent detection on the processed signal.

2. The method according to claim 1 wherein the pulse train comprises a number N of delayed information pulses; wherein the first information pulse of the pulse train is delayed with respect to the reference pulse, and each other information pulse of the pulse train is delayed with respect to the preceding information pulse in the pulse train.

3. The method according to claim 2 wherein the pulse train defines $2^N$ possible values for the information.

4. The method according to claim 1 wherein each information pulse has a polarity.

5. The method according to claim 1 wherein the pulse signal comprises an Ultra Wide Band (UWB) signal.

6. The method according to claim 1 wherein the pulse signal comprises an Ultra Wide Band Impulse Radio (UWB-IR) signal.

7. A communication method performed in a transceiver device, the method comprising:
sending, from the transceiver device, an Ultra Wide Band (UWB) pulse signal comprising a reference pulse followed by a pulse train, the pulse train including at least a first information pulse delayed with respect to the reference pulse by a first delay, and a second information pulse delayed with respect to the first information pulse by a second delay different from the first delay; and
decoding a received pulse signal, at the transceiver device, by at least
adding to the pulse signal, a first version of the modulated pulse signal respectively delayed with the second delay, and subtracting from the modulated pulse signal, a second version of the modulated pulse signal respectively delayed with a third delay equal to the second delay minus the first delay for obtaining a processed signal based upon the transmitted reference modulation scheme, and
performing a non-coherent detection on the processed signal.

8. The method according to claim 7 wherein the pulse train comprises a number N of delayed information pulses; wherein the first information pulse of the pulse train is delayed with respect to the reference pulse, and each other information pulse of the pulse train is delayed with respect to the preceding information pulse in the pulse train.

9. The method according to claim 8 wherein the pulse train defines $2^N$ possible values for the information.

10. The method according to claim 7 wherein each information pulse has a polarity.

11. The method according to claim 7 wherein the UWB pulse signal comprises an Ultra Wide Band Impulse Radio (UWB-IR) signal.

12. A communications device comprising:
a transmitter configured to send a pulse signal;
a coder coupled to said transmitter and configured to repetitively send a reference pulse followed by a pulse train, the pulse train including at least a first information pulse delayed with respect to the reference pulse by a first delay, and a second information pulse delayed with respect to the first information pulse by a second delay different from the first delay;
a receiver configured to receive a transmitted pulse signal; and
a decoder coupled to the receiver and configured to decode the received pulse signal by adding to the pulse signal, a first version of the modulated pulse signal respectively delayed with the second delay, and subtracting from the modulated pulse signal, a second version of the modulated pulse signal respectively delayed with a third delay equal to the second delay minus the first delay for obtaining a processed signal based upon the transmitted reference modulation scheme, and performing a non-coherent detection on the processed signal.

13. The communications device according to claim 12 wherein the pulse train comprises a number N of delayed information pulses; wherein the first information pulse of the pulse train is delayed with respect to the reference pulse, and each other information pulse of the pulse train is delayed with respect to the preceding information pulse in the pulse train.

14. The communications device according to claim 13 wherein the pulse train defines $2^N$ possible values for the information.

15. The communications device according to claim 12 wherein each information pulse has a polarity.

16. The communications device according to claim 12 wherein said transmitter is configured to send the pulse signal as an Ultra Wide Band (UWB) signal.

17. The communications device according to claim 12 wherein said transmitter is configured to send the pulse signal as an Ultra Wide Band Impulse Radio (UWB-IR) signal.

* * * * *